(12) United States Patent
Chu

(10) Patent No.: US 8,454,725 B2
(45) Date of Patent: Jun. 4, 2013

(54) METHOD AND EQUIPMENT FOR IMPROVING GLOBAL WARMING AND AIR POLLUTION

(75) Inventor: Rey-Chin Chu, Taipei (TW)

(73) Assignee: Rey-Chin Chu, Taipei (TW)

(*) Notice: Subject to any disclaimer, the term of this patent is extended or adjusted under 35 U.S.C. 154(b) by 0 days.

(21) Appl. No.: 12/967,867

(22) Filed: Dec. 14, 2010

(65) Prior Publication Data

US 2011/0079148 A1  Apr. 7, 2011

Related U.S. Application Data

(62) Division of application No. 11/738,466, filed on Apr. 21, 2007, now abandoned.

(30) Foreign Application Priority Data

Feb. 8, 2007 (TW) ................................ 96102248 A
Mar. 23, 2007 (TW) ................................ 96110137 A

(51) Int. Cl.
*B01D 47/02* (2006.01)
(52) U.S. Cl.
USPC ........................................ 95/23; 95/24; 95/149
(58) Field of Classification Search
USPC .................... 239/2.1, 14.1; 60/310; 55/385.1, 55/385.3, DIG. 30; 96/227, 228, 231, 233, 96/234, 247, 248, 249, 250
See application file for complete search history.

(56) References Cited

U.S. PATENT DOCUMENTS

| | | | | |
|---|---|---|---|---|
| 1,825,131 A | * | 9/1931 | Shepherd | 239/8 |
| 6,032,462 A | * | 3/2000 | Chu | 60/310 |

* cited by examiner

*Primary Examiner* — Duane Smith
*Assistant Examiner* — Minh-Chau Pham
(74) *Attorney, Agent, or Firm* — Litron Patent & Trademark Office; Min-Lee Teng

(57) ABSTRACT

A method and an equipment for improving global warming and air pollution are proposed, wherein hot exhaust gas generated by a thermal machine is injected into an exhaust boosting unit to be compressed and mixed with a liquid medium for atomization. Pollutants in the hot exhaust gas and heat generated due to combustion are adsorbed by the liquid medium. After the liquid medium passes a dust collecting unit, the pollutants adsorbed by the liquid medium will adhere to the dust collecting unit. Humid and hot clean air is extracted to the atmosphere, and rises to high altitudes and is cooled there. Water will drop to the ground in the form or rain or snow to cool the ground temperature and remove other pollutants in the air. Heat circulation and water circulation can be sped up to improve the situation of global warming and render more water resource to the Earth.

8 Claims, 7 Drawing Sheets

METHOD AND EQUIPMENT FOR IMPROVING GLOBAL WARMING AND AIR POLLUTION

Figure 1:
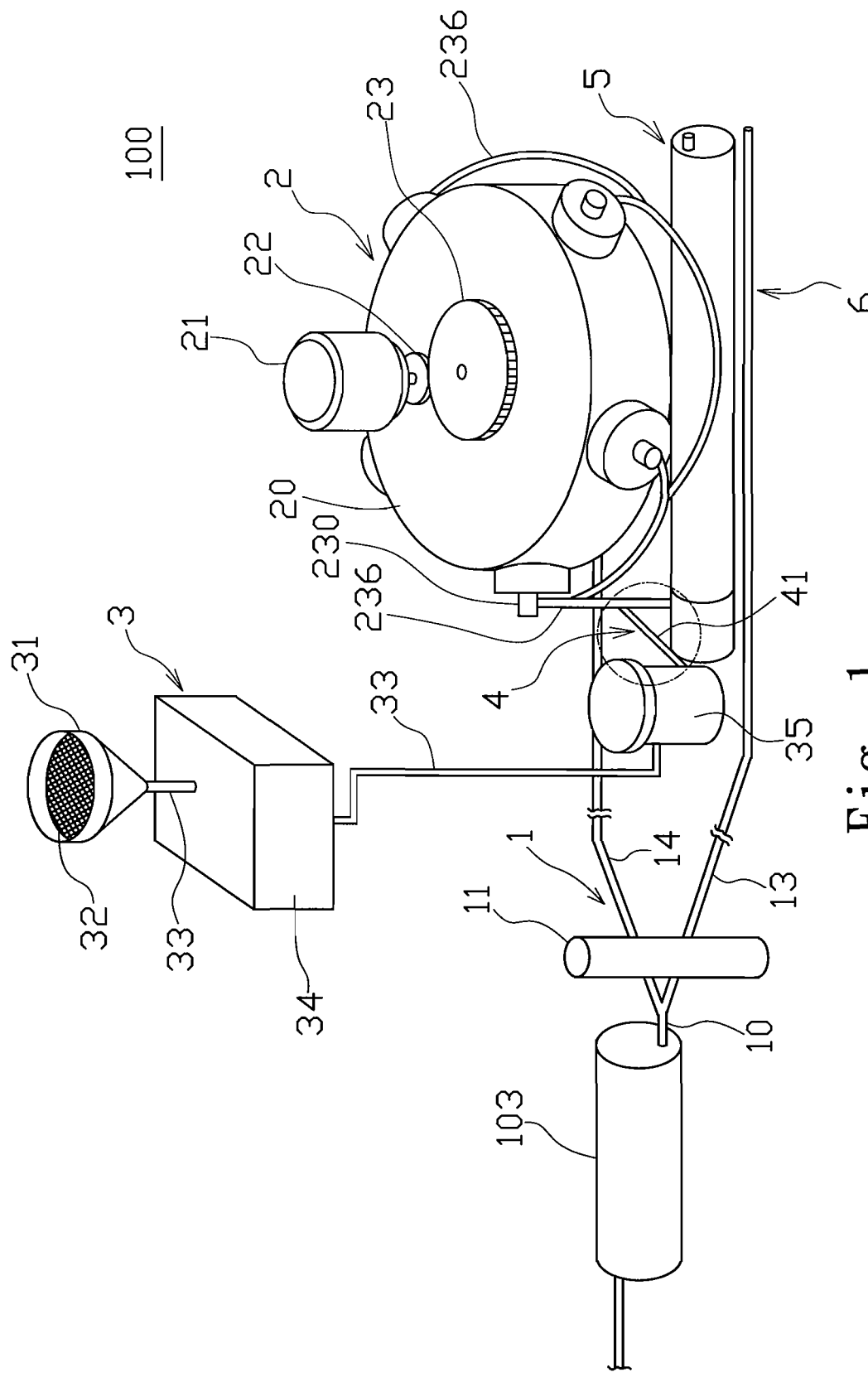

The current application is a divisional application of, and claims a priority to the U.S. Ser. No. 11/738,466 filed on Apr. 21, 2007 now abandoned.

The U.S. Ser. No. 11/738,466 claimed the following two foreign priorities:
1. Taiwan, 96102248, filed on Feb. 8, 2007
2. Taiwan, 96110137, filed on Mar. 23, 2007

BACKGROUND OF THE INVENTION

1. Field of the Invention

The present invention relates to a method and an equipment for improving global warming and air pollution and, more particularly, to a method and an equipment for processing hot exhaust gas generated by various kinds of thermal machines.

2. Description of Related Art

In recent several decades, various forms of thermal machines (including internal combustion machines (e.g., engines), external combustion machines (e.g., boilers) and electric thermal machines or other thermal machines such as cars, cement plants, dryers, thermal processing equipments, and so on) have been extensively used by human to achieve revolutionary convenience of human life. However, this also results in detrimental consequences like global warming and air pollution. These thermal machines need to burn petroleum or coal to produce a large amount of heat for operation. The discharged exhaust gas contains suspended particulates like carbon particles and powders in addition to harmful chemical gases like CO, hydrocarbon, $NO_x$, and sulfide. These particulates and chemical gases may be inhaled by people to become a major cause to endanger the human health. Moreover, at the same time when thermal machines discharge exhaust gas, a large amount of heat will also be released to the atmosphere. Equipments making use of electric energy to generate high temperatures for thermal processing also produce a large amount of heat and discharge pollutants into the atmosphere.

In the world, there are innumerable thermal machines discharge pollutants and high-temperature gases day and night and year in and year out so that the nature cannot bear and tend to collapse. The temperature of the nature constantly keep within an appropriate range through the balance between condensation (heat release) and evaporation (heat absorption) of water. This balancing effect of temperature in which water on the ground absorbs heat to evaporate and rise to high altitudes and cools and condenses into snow or rain to drop to the ground is a natural law on the Earth for tens of millions of years. However, because lands have been covered by buildings and roads and forests have been cut down and destroyed by human due to population explosion, the nature can no longer conserve enough water for evaporation through heat absorption, hence weakening the balancing effect of temperature of the nature. Moreover, people utilize various kinds of thermal machines to generate a considerable amount of extra heat that did not originally exist in the nature and endangers humans, animals, plants, rivers and lakes on the Earth. The atmospheric temperature will rise, rivers and lakes will dry out, forest fires will more frequently happen, icebergs will melt, and the ecology of animals and plants will be damaged to cause extinction. Under this situation, the human can hardly survive alone. The prospects cause much anxiety. However, there are no appropriate methods yet that can improve this situation.

At present, carbon dioxide ($CO_2$) is considered to be a major cause of causing the greenhouse effect of the Earth. Therefore, many countries have signed a pact to restrain the discharge of carbon dioxide in order to improve the situation that the atmospheric temperature of the Earth gradually rises. The restriction of carbon dioxide discharge, however, will affect industry growth and economic development. Therefore, the pact has weak effect, and is a passive approach. In consideration of gradual serious air pollution that affects the environment and human health, the applicant has proposed an exhaust pollution processing equipment in the disclosure of Taiwan Pat. No. 583,381 to reduce the negative influences car exhaust makes on the natural environment. The above disclosure, however, emphasizes the replenishment and saving of water that evaporates due to mixing with high-temperature exhaust gas, the method of repetitively filtering waste water formed by mixing water with engine exhaust containing carbon particles and powders, and the storage and processing structure and method after carbon particles are separated from water. No matter how water is saved, there is still some water used, which is unsatisfying under the universal situation of water scarcity in the world. Moreover, the engine power will be affected. Besides, during the circulative filtering process of waste water, oil in the exhaust gas will adhere to the filter core of the filter and the scraper to deteriorate the filtering effect.

SUMMARY OF THE INVENTION

In consideration of the above drawbacks and problems of insufficient water content of the ground and gradual warming of the Earth, a primary object of the present invention is to provide a method and an equipment for improving global warming and air pollution, in which hot exhaust gas generated by a thermal machine is injected into an exhaust boosting unit to be compressed so that the hot exhaust gas can be mixed with a liquid medium for atomization and evaporation. Tiny pollution particulates and powders in the hot exhaust gas can thus be adsorbed and removed by the liquid medium to achieve the object of cleaning the air. Moreover, humid and hot clean air discharged to the atmosphere can speed up heat circulation and water circulation so as to improve the situation of gradual warming of the Earth.

The present invention utilizes high-temperature exhaust gas and liquid like water as the medium to transfer heat of the ground and atmosphere to high altitudes so as to form a heat exchange mechanism. The situations of global warming, air pollution, river pollution, water resource scarcity, iceberg melting, and so on can thus be improved so that the Earth can regain vitality, and humans and all creatures can sustain. Besides, an ordinary exhaust unit is used to allow people to be able to control whether water is evaporated or not in order to guide the weather to develop toward the direction favorable to humans. The vicious circles of extra heat, pollution, water source scarcity, iceberg melting, and so on caused by humans can therefore be mitigated.

Another object of the present invention is to provide a method and an equipment for improving global warming and air pollution, in which an air boosting unit is used to let exhaust gas of an engine generate enough airflow to fully mix with water for atomization and evaporation when passing the throat of a Venturi tube under the situation that the engine does not generate back pressure. Tiny carbon particles and powders in the exhaust gas can thus be adsorbed and removed by water to mitigate the problem of air pollution and global warming caused by engine exhaust.

The present invention bases on the principle that water is evaporated when heated and condensed when cooled and the principle that water can wash off smoke. Heat in the hot exhaust gas will be absorbed by water to form vapor, which rises quickly to high altitudes to be cooled there. After sufficient conditions are met, water will drop to the ground in the form or rain or snow to properly cool the atmospheric environment.

In addition to carbon particles and powders generated in the exhaust gas of a thermal machine and floating around in the air, the atmosphere also contains powders generated when the ground is run over by cars, powders generated when car tires wear, powders generated when clothes and shoes wear, and so on. These powders generated by innumerable objects float around in the air to pollute the air and are hardly to clean away. Moreover, the problem of water scarcity due to population explosion and the problem of pollution in rivers and lakes becomes more serious nowadays. The present invention can utilize water, waste water or seawater as supplemental water to mix with hot exhaust gas for atomization. Pollution particulates and powders in the hot exhaust gas can be adsorbed and collected in a dust collector. Humid and hot clean air rises to high altitudes The remaining humid and hot clean air is extracted to the atmosphere, and rises to high altitudes and is cooled there. After sufficient conditions are met, water will drop to the ground in the form or rain or snow to cool the ground temperature. In this process, all particulates floating around in the air will be cleaned away by rain or snow to get a clean atmospheric environment. This heat exchange mechanism not only can speed up heat circulation, but also can solve the problems of global warming and air pollution. Moreover, water circulation can also be accelerated to render more water resource to the Earth. Once the global warming is slowed down, energy consumed by air conditioners will drop drastically to save energy. When water resource increases, both the problem of pollution in rivers and lakes and the problem of water scarcity can be mitigated.

BRIEF DESCRIPTION OF THE DRAWINGS

The various objects and advantages of the present invention will be more readily understood from the following detailed description when read in conjunction with the appended drawing, in which:

FIG. 1 is a perspective assembly view of an equipment for improving global warming and air pollution according to a preferred embodiment of the present invention;

FIG. 2 is a cross-sectional view of an equipment for improving global warming and air pollution according to the preferred embodiment of the present invention;

FIG. 3 is a partly enlarged cross-sectional view of FIG. 2;

FIG. 4 is a partly enlarged view of FIG. 2, showing the actions of leading in water and stopping water of the lower water reservoir and its correlation with a boosting motor and a solenoid valve when there is no water;

FIG. 5 is a partly enlarged cross-sectional view of FIG. 2, showing the structures of a Venturi tube and related components;

FIG. 6 is a partly enlarged cross-sectional view of FIG. 2, showing the structure of a check valve and the action of an exhaust pipe when engine exhaust gas is compressed by the cylinder and enters the check valve to be boosted;

FIG. 7 is a partly enlarged cross-sectional view of FIG. 2, showing the structures of a dust collecting unit and related components; and FIG. 8 is a side view of the equipment for improving global warming and air pollution that is installed on a car body according to a preferred embodiment of the present invention.

DETAILED DESCRIPTION OF THE PREFERRED EMBODIMENTS

FIGS. 1 and 8 show an equipment 100 for improving global warming and air pollution according to a preferred embodiment of the present invention. The equipment 100 comprises an exhaust injection unit 1, an exhaust boosting unit 2, a water storage unit 3, a gas-liquid mixing unit 4, a dust collecting unit 5, and an ordinary exhaust unit 6, and is disposed at an appropriate position of the body of a car 101. In addition to processing pollutants like carbon particles and powders in the exhaust gas of an engine 102 of the car 101, the equipment 100 can also make use of water to absorb heat in the exhaust gas of the engine 102. It should be noted that the equipment 100 for improving global warming and air pollution can be properly adjusted and varied and the exhaust boosting unit 2 can utilize various air boosting equipments in order to apply to other movable or stationary exhaust sources that produce exhaust gas and waste heat.

As shown in FIGS. 1, 2 and 8, the exhaust injection unit 1 has an exhaust pipe 10 connected to an engine silencer 103 of the car 101. The exhaust pipe 10 is divided into two exhaust side pipes 13 and 14. A solenoid valve 11 is disposed at an appropriate position of the exhaust side pipes 13 and 14.

As shown in FIGS. 1, 2, 3 and 6, the exhaust boosting unit 2 includes a compressor shell 20, a motor 21, a gear 22 driven by the motor 21, a transmission gear 23, a transmission gear shaft 24, and a counterweight 25. One side of the counterweight 25 is screw-fitted with a link disk 26. When the engine 102 of the car 101 is started, the motor 21 is electrified to drive the gear 22, the transmission gear 23, the transmission gear shaft 24 and the counterweight 25 to rotate so that a piston 27 of each cylinder can move up and down along the cylinder. When the motor 21 is electrified, the solenoid valve 11 of the exhaust injection unit 1 is also electrified so that a core 12 (shown in FIG. 2) is attracted upwards by a coil 16 to conduct a valve 18 and the exhaust side pipe 14. Exhaust gas of the engine 102 enters the exhaust side pipe 14 from the exhaust pipe 10, and then enters the exhaust boosting unit 2 via an exhaust intake 15, and then passes through a cylinder air intake 28 to enter the cylinder. During the downward stroke of the piston 27 along the cylinder, smoke exhaust flows from a cylinder vent 232 through a check valve 230 and enters a boosted exhaust pipe 236. As shown in FIG. 6, a spring 235 is provided in a spring groove 234, and a pressure adjustment bolt 231 is used to adjust the elastic force. The front end of the spring 235 abuts against a pushing rod 233 of the check valve 230 to let the pushing rod 233 and the cylinder vent 232 be tightly fitted together, hence preventing compressed air discharged from the cylinder from flowing back.

As shown in FIGS. 1, 2, 4 and 8, the water storage unit 3 comprises a water inlet 31, a filter screen 32, an aqueduct 33, an upper water reservoir 34, a lower water reservoir 35, an inlet valve float ball 36, a stopcock 37, a float ball valve rod 38, and a float ball valve rod supporting base 39. Rain or water is injected via the water inlet 31 to be filter by the filter screen 32, and passes the aqueduct 33 to enter the upper water reservoir 34 and the lower water reservoir 35. When water in the lower water reservoir 35 increases, the float ball 36 rises until the water in the lower water reservoir 35 is full. At this time, the stopcock 37 on the float ball valve rod 38 will shut the opening of the aqueduct 33. If water in the lower water reservoir 35 decreases, the float ball 36 drops, and the stopcock 37 moves away from the opening of the aqueduct 33 so that water in the upper water reservoir 34 can flow into the lower water reservoir 35 along the aqueduct 33 until the float ball 36 rises to let the stopcock 37 shut the opening of the aqueduct 33.

Figure 2:
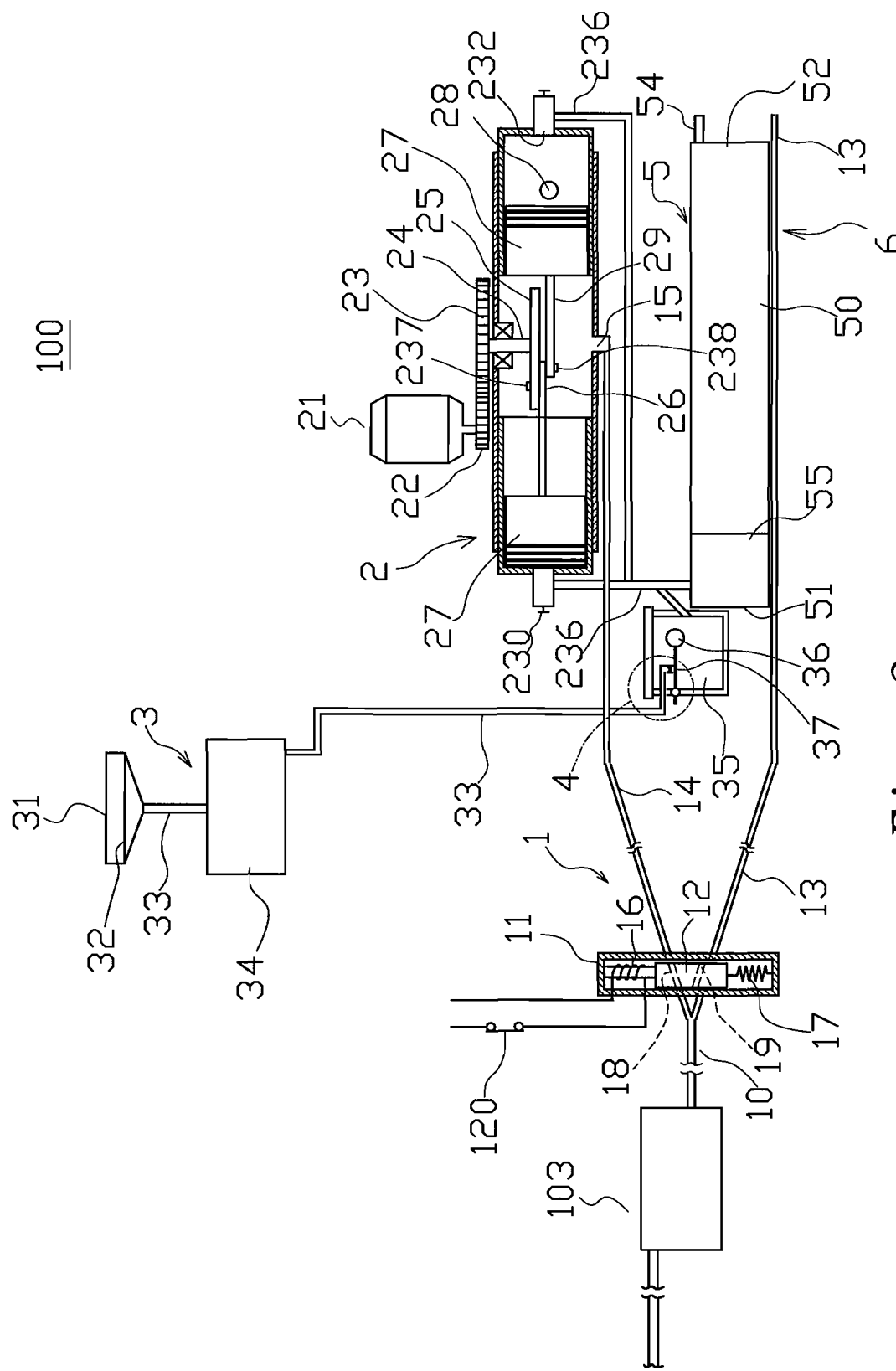
Figure 3:
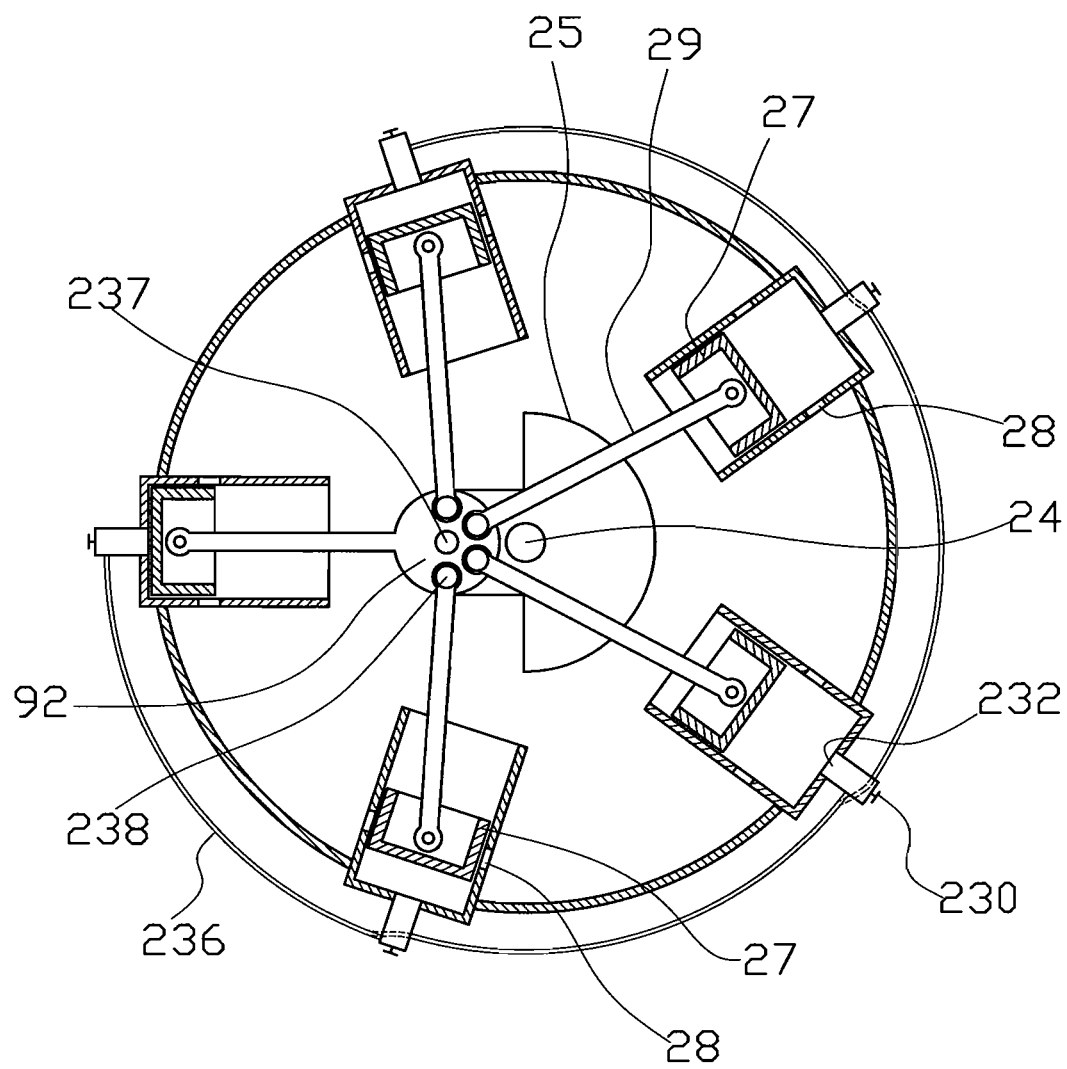
Figure 5:
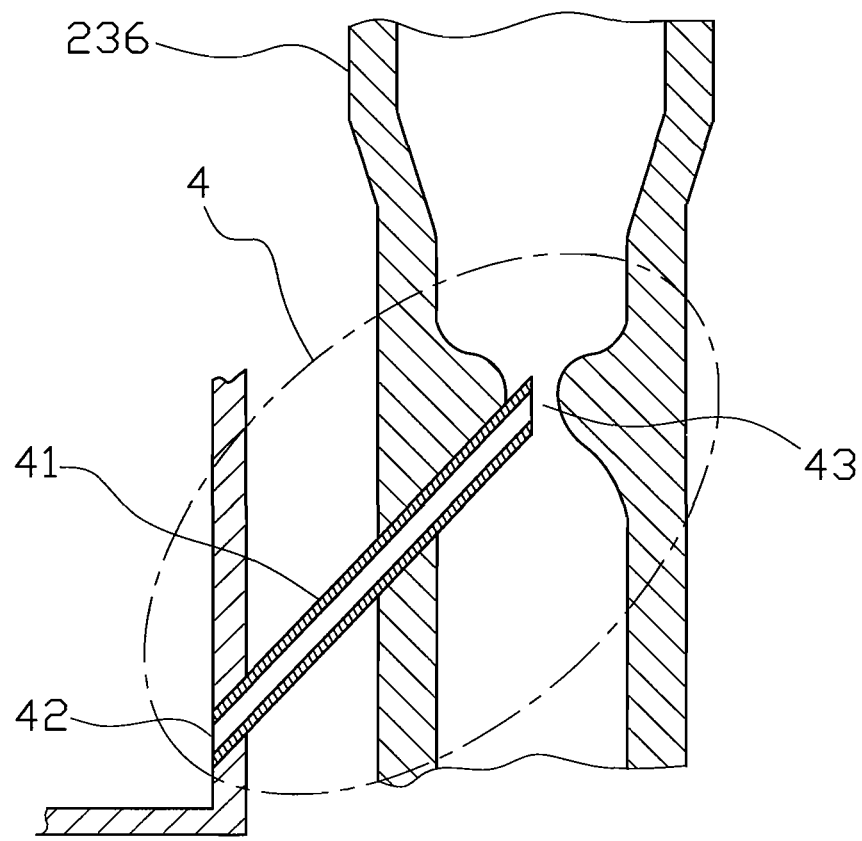
Figure 6:
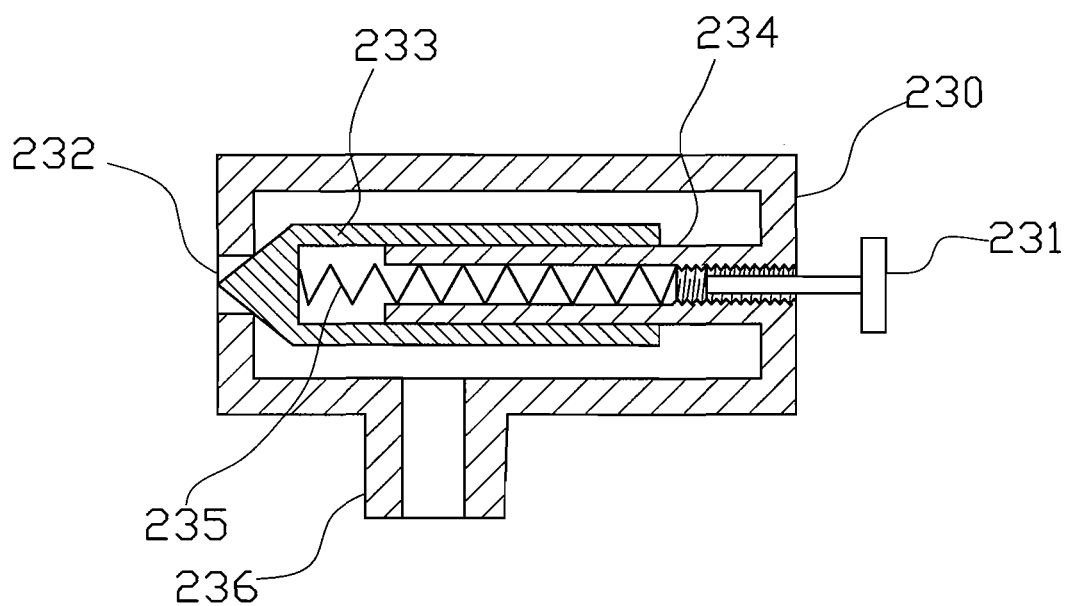
Figure 7:
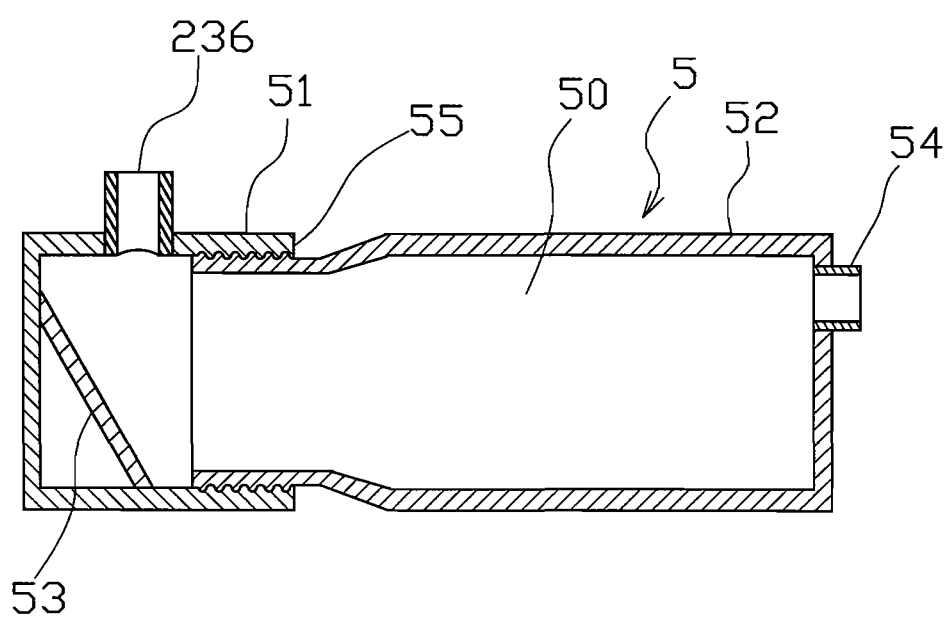
Figure 8:
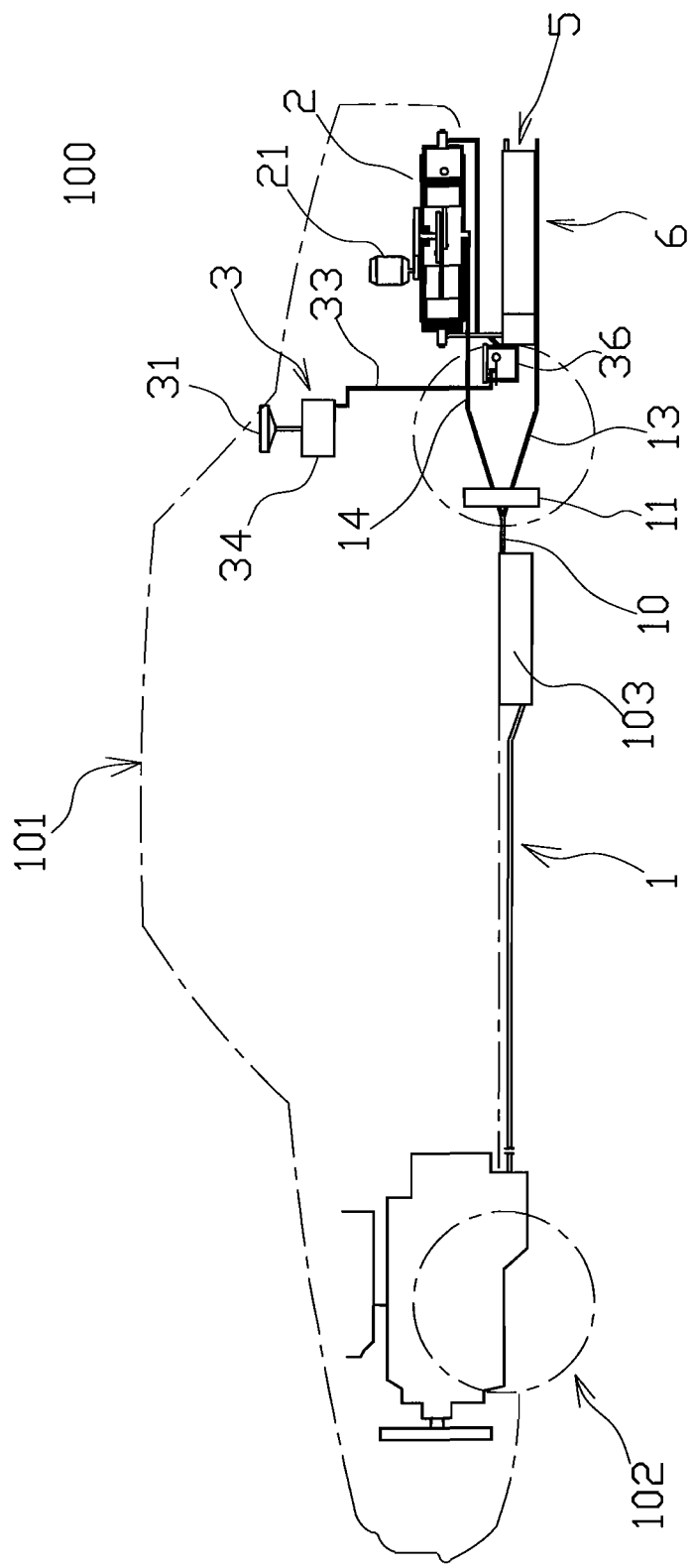

As shown in FIGS. 1, 2 and 5, the gas-liquid mixing unit 4 includes a Venturi tube installed at an appropriate position on the boosted exhaust pipe 236 and a water pipe 41 for connecting a bottom 42 of the lower water reservoir 35 and a throat 43 of the Venturi tube. Engine exhaust gas flows through the exhaust pipe 10, the exhaust side pipe 14 and the exhaust intake 15 to enter the exhaust boosting unit 2, and passes the cylinder air intake 28 to enter the cylinder to be compressed, and then passes the cylinder vent 232 to press open the pushing rod 233 of the check valve 230, and finally enters the boosted exhaust pipe 236. During the boosting process of exhaust gas, the engine 102 won't produce any back pressure. When exhaust gas passes the throat 43 of the Venturi tube, water is atomized to mix with smoke exhaust. Particulates in the smoke exhaust will be adsorbed by water to become larger, heavier and damper, and a large amount of heat generated due to combustion in the engine 102 will also be absorbed by water to form humid and hot gas, which enters the dust collecting unit 5.

As shown in FIGS. 1, 2, 7 and 8, the dust collecting unit 5 has a dust collecting room 50, which is formed by screw-fitting two circular pipes 51 and 52. A diversion plate 53 is provided inside the circular pipe 51. An exhaust outlet 54 is provided at one side of the circular pipe 52. After exhaust gas of the engine 102 passes the throat 43 of the Venturi tube, particulates in the smoke exhaust will be adsorbed by water to become polluted water and clean gas, which then enter the dust collecting room 50. Because of the large inner space of the dust collecting room 50, the speed of the clean gas will be lower, and the heavier polluted water will distribute on the walls of the dust collecting room 50 along the diversion of the diversion plate 53. The humid and clean air is discharged to the atmosphere via the exhaust outlet 54. Therefore, the humid and clean air can bring heat to high altitudes to be cooled there, and water contained therein will drop to the ground in the form of rain of snow, hence completing a heat exchange process.

Although the above embodiment of the present invention utilizes used waste water as the medium for heat absorption and evaporation, in some conditions, seawater may be more convenient. However, after seawater is evaporated, salt will be left in the dust collecting room 50. In this situation, the circular pipe 52 can be turned to separate from the circular pipe 51 for removing the salt and then installed back for successive use.

Figure 4:
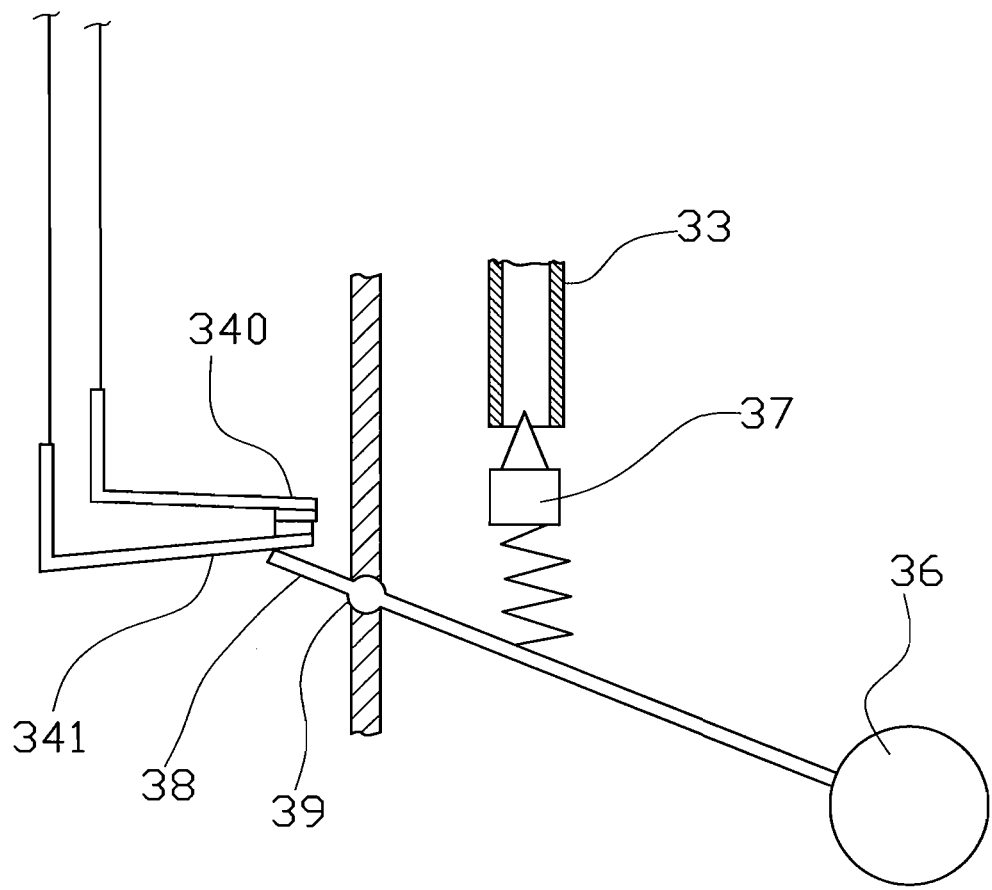

In order to improve the current situation of global warming and air pollution, the equipment of the present invention should be installed in various kinds of man-made thermal machines. Cooperated with sufficient supply of water, a considerate amount of water or waste water is evaporated to make full use of natural conditions to improve the natural environment. However, some special situations may still happen (e.g., water in a running car or an operating machine is depleted and instant replenishment of water is not allowed; or in a cold winter or there is too much rain). In these situations, the weather condition obtained from weather prediction organizations should be comprehensively taken into consideration. When machines stop evaporating water, the replenishment of water is halted, and the smoke exhaust enters the ordinary exhaust unit 6. As shown in FIGS. 1, 2 and 4, when water in the upper and lower water reservoirs 34 and 35 is depleted, the front end of the float ball valve rod 38 in the lower water reservoir 35 comes down, and the rear end thereof is raised to push a circuit contact 341 upwards to contact a circuit contact 340. The circuit contact of the motor 21 of the exhaust boosting unit immediately jumps off to stop the operation of boosting exhaust. A circuit contact 120 of the solenoid valve 11 in the exhaust injection unit 1 simultaneously jumps off to cause loss of excitation of the coil 16. The core 12 is thus pulled back by the spring 17 to conduct a valve 19 and the exhaust side pipe 13. Therefore, exhaust gas of the engine 102 passes the exhaust pipe 10 to enter the exhaust side pipe 13, and is finally discharged out from the tail end thereof.

To sum up, the present invention utilizes water to absorb heat discharged by a thermal machine to form water vapor, which then rises to high altitudes to condense into water again and release heat when encountering cool water, and drops to the ground in the form of rain of snow, hence speeding up the heat circulation and also the water circulation. Moreover, the present invention can determine whether to evaporate water or not by filling or not filling water into the water storage unit so as to control a change mechanism of the weather. In this manner, people can gradually guide the ecological environment with serious problems such as global warming, dry-up of rivers and lakes, gradual melting of icebergs, forest fires, air pollution, and so on to development toward a positive and virtuous circle, and can control the weather to develop toward the direction favorable to humans.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A method for improving global warming and air pollution comprising the steps of:
   receiving hot exhaust gas generated by a thermal machine whereby a solenoid valve is used to control the guiding of said hot exhaust gas;
   boosting said hot exhaust gas;
   providing a liquid medium to absorb heat of said hot exhaust gas and mix with said hot exhaust gas to form a humid and hot exhaust gas;
   collecting pollutants in said humid and hot exhaust gas to form a humid and hot clean air that is extracted to atmosphere and rises to high altitudes to meet with cold air so as to condense and release heat and form rain or snow dropping to ground, thereby speeding up atmospheric heat circulation and water circulation;
   said liquid medium is injected into an upper water reservoir and stored in a lower water reservoir;
   said lower water reservoir includes a float ball valve rod; and
   an inlet valve float ball is connected at a distal end of said float ball valve rod, and said inlet valve float ball floats on said liquid medium and rises with an increase of said liquid medium to lead an up action of said float ball valve rod in order to block an outlet of said liquid medium in said upper water reservoir, thereby stopping said liquid medium from flowing into said lower water reservoir.

2. The method for improving global warming and air pollution as claimed in claim 1, wherein whether said liquid medium is provided or not determines whether said humid and hot exhaust gas is evaporated or not in order to control a weather change mechanism.

3. The method for improving global warming and air pollution as claimed in claim 1, wherein in said step of boosting said hot exhaust gas, said hot exhaust gas is injected into an air booster, which is driven to compress said hot exhaust gas by using a motor to lead a gear set to rotate.

4. The method for improving global warming and air pollution as claimed in claim 1, wherein said liquid medium is water, waste water, or seawater.

5. The method for improving global warming and air pollution as claimed in claim 1, wherein motion of said float ball valve rod jointly and electrically controls a flow path of said hot exhaust gas.

6. The method for improving global warming and air pollution as claimed in claim 5, wherein the motion of said float ball valve rod jointly and electrically controls operation of said solenoid valve.

7. The method for improving global warming and air pollution as claimed in claim 1, wherein in said step of providing a liquid medium to absorb heat of said hot exhaust gas and mix with said hot exhaust gas to form a humid and hot exhaust gas, said hot exhaust gas and said liquid medium are mixed and atomized to form an atomized humid and hot exhaust gas.

8. The method for improving global warming and air pollution as claimed in claim 1, wherein said thermal machine is an internal combustion machine, an external combustion machine, or an electric thermal processing equipment.

\* \* \* \* \*